Jan. 6, 1970    J. A. HOWE    3,488,529
TEMPERATURE SENSING CURRENT SOURCE
Filed Dec. 14, 1966    2 Sheets-Sheet 1

REF. CURRENT SWITCH

INVENTOR
JAMES A. HOWE
BY Thomas J. Nikolai
ATTORNEY

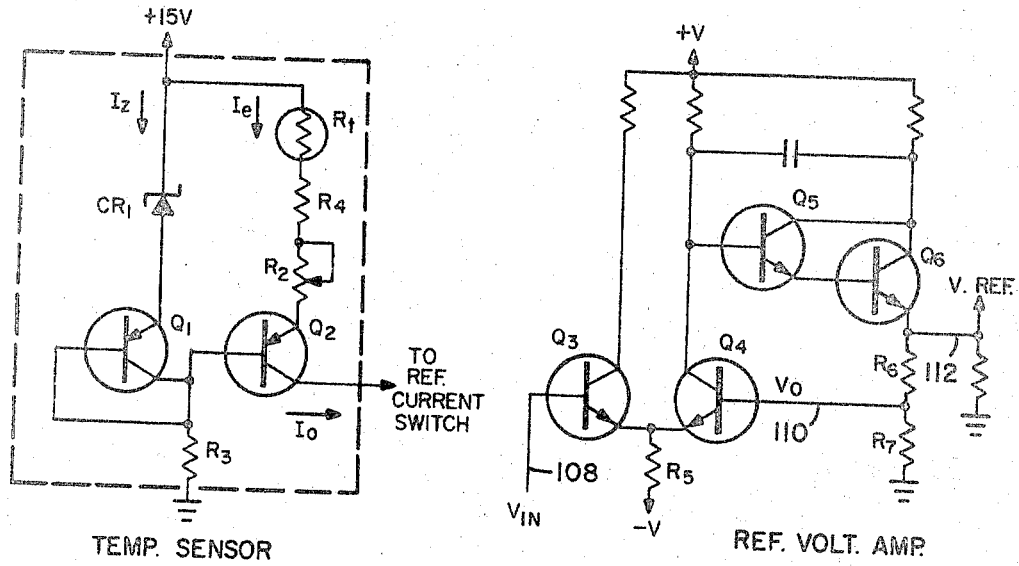
TEMP. SENSOR
Fig. 3
REF. VOLT. AMP.
Fig. 4
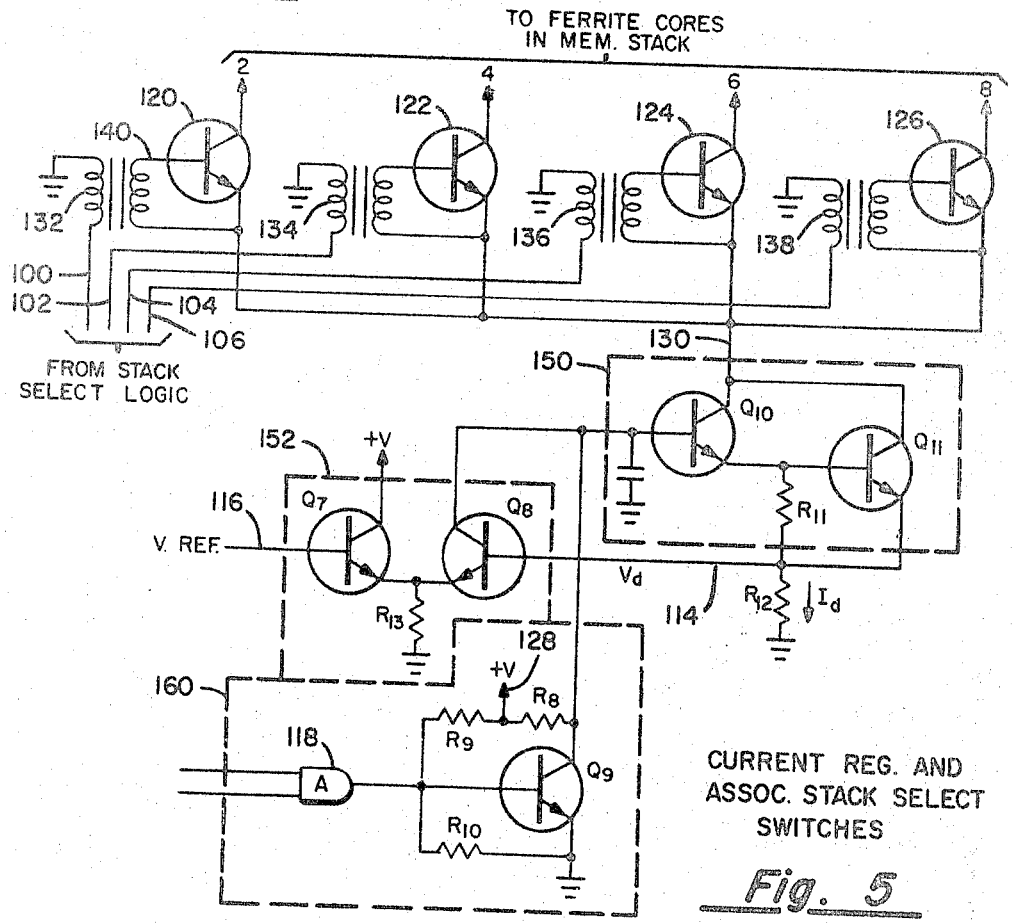
CURRENT REG. AND ASSOC. STACK SELECT SWITCHES
Fig. 5 be disclosed in the course of the following specification,
United States Patent Office 3,488,529
Patented Jan. 6, 1970

3,488,529
TEMPERATURE SENSING CURRENT SOURCE
James A. Howe, St. Paul, Minn., assignor to Sperry Rand Corporation, New York, N.Y., a corporation of Delaware
Filed Dec. 14, 1966, Ser. No. 601,726
Int. Cl. H03k 5/00
U.S. Cl. 307—310                    4 Claims

ABSTRACT OF THE DISCLOSURE

A device for sensing the temperature in a memory stack so that the drive current may be changed to compensate for the magnetic core characteristics over a wide temperature range.

---

Magnetic ferrite core elements are used not only for the storage of information in electrical computing apparatus, but also are used as transformer couplings in other apparatus associated with computers such as switch circuits. Each magnetic core has a substantially rectangular hysteresis loop characteristic. Thus, if the core is magnetized in a first direction, and a proper magnetic field is produced by currents through appropriate conductors, the magnetization of the core will reverse completely into a second direction. When being used as a storage device, a core is normally threaded by at least a pair of conductors which control the switching thereof. As a half-select current is passed through one conductor alone, no change in the magnetic state occurs. If both conductors are pulsed simultaneously with half-select currents, there will be a sufficient magnetic field produced to reverse the magnetization of the core.

It is well known that excessive heating of magnetic core elements causes degradation of the hysteresis loop, i.e., the hysteresis loop shrinks. After the loop shrinks sufficiently, it becomes possible for a half-select current pulse to switch the magnetization of the core. This, of course, causes a loss of the information stored in or transmitted by the core.

One method of correcting the problem is to prevent hysteresis loop degradation by installing the affected cores in an atmosphere where constant temperature is maintained. However, this procedure is very costly and requires considerable extra apparatus.

Another prior art solution is to provide a test core that is associated with a group of cores such as a memory stack which test core produces an output signal whenever overheating of the test core, and thus the memory stack, occurs. This output signal can then be used to control the operation of the apparatus, i.e., temporarily arresting operation of the apparatus or reducing speed of operation, thereby permitting cooling of the overheated cores. Obviously, while this approach may be effective, it requires a loss of time through reducing speed of operation or temporarily arresting the operation of the device.

In other prior art devices, control of the current through the core conductors is achieved by the setting of a voltage from a regulated voltage supply. While this method assures constant amplitude current pulses to be applied to the conductors, it does not prevent temperature changes from so shrinking the core's hysteresis loop that the half-select current pulses of constant amplitude are sufficient to change the magnetization of the core and thus cause a loss of information stored in or transmitted by the core.

The present invention solves the problem of the prior art by sensing the temperature in a group of cores, such as a memory stack, and developing a reference current output signal and coupling the output signal to a current regulator that changes the amplitude value of the drive current to the cores to compensate for the change in each of the core's hysteresis loop characteristic over a wide temperature range, thus preventing loss of information stored in or transmitted by the core.

This desired result is accomplished by utilizing a temperature sensor comprising two matched transistors which draw approximately equal base and collector currents, a temperature compensated Zener diode and a temperature sensitive resistance such as a sensistor having a known temperature coefficient to sense temperature changes. Thus variations in transistor parameters are effectively cancelled by the matched pair of transistors, and the Zener diode is accurate over a wide temperature range. Therefore, changes in the reference output current from the sensor, due to temperature changes, will depend almost entirely upon variations in the resistance which may be accurately predicted.

Thus it is an object of the present invention to change the drive current of individual cores of a magnetic core array to compensate for the core characteristics over a wide temperature range.

It is an object of the present invention to provide a temperature sensor which will produce an output current due to temperature changes that will depend almost entirely upon variations in a resistance which may be accurately predicted.

This and other more detailed and specific objects will
reference being had to the accompanying drawings, in which:

FIGURE 3 is a circuit diagram of the inventive temperature sensor;

FIGURE 4 is a circuit diagram of a conventional reference voltage amplifier; and FIGURE 5 is a circuit diagram showing a particular current regulator which controls the core drive current through a group of core stack select switches.

In general, whenever a plurality of core memory stacks are used, a temperature sensor would be located in each stack. Whenever any particular stack is in use, the temperature sensor for that stack must be utilized to provide an output current that is linearly dependent upon the temperature which is coupled to a plurality of current regulators. The current regulators then control the amount of drive current being fed to the cores of the matrix array by drive (or inhibit) lines. This drive current depends on the temperature. Each current regulator may have its output connected to corresponding drive (or inhibit) lines in each memory stack. Thus, if each memory stack has thirty-two read (or inhibit) inputs, thirty-two current regulators can be used to control the drive currents applied to the inputs. Further, any number of such memory stacks may be connected in parallel to the thirty-two current regulators as long as sufficient drive is available.

Thus, the magnetic core drive current control circuit comprises at least one magnetic core having at least first and second stable states of magnetization, a plurality of conductors threaded through such core for changing the state of magnetization of said core by the application of drive currents to at least two of said conductors, a temperature sensor associated with said core for detecting the temperature in the vicinity of said core and for producing an output current the value of which depends upon said temperature, and means coupled to said temperature sensor and to said conductors for receiving said output current and regulating the drive currents through said conductors in proportion to said output current.

Figure 1:
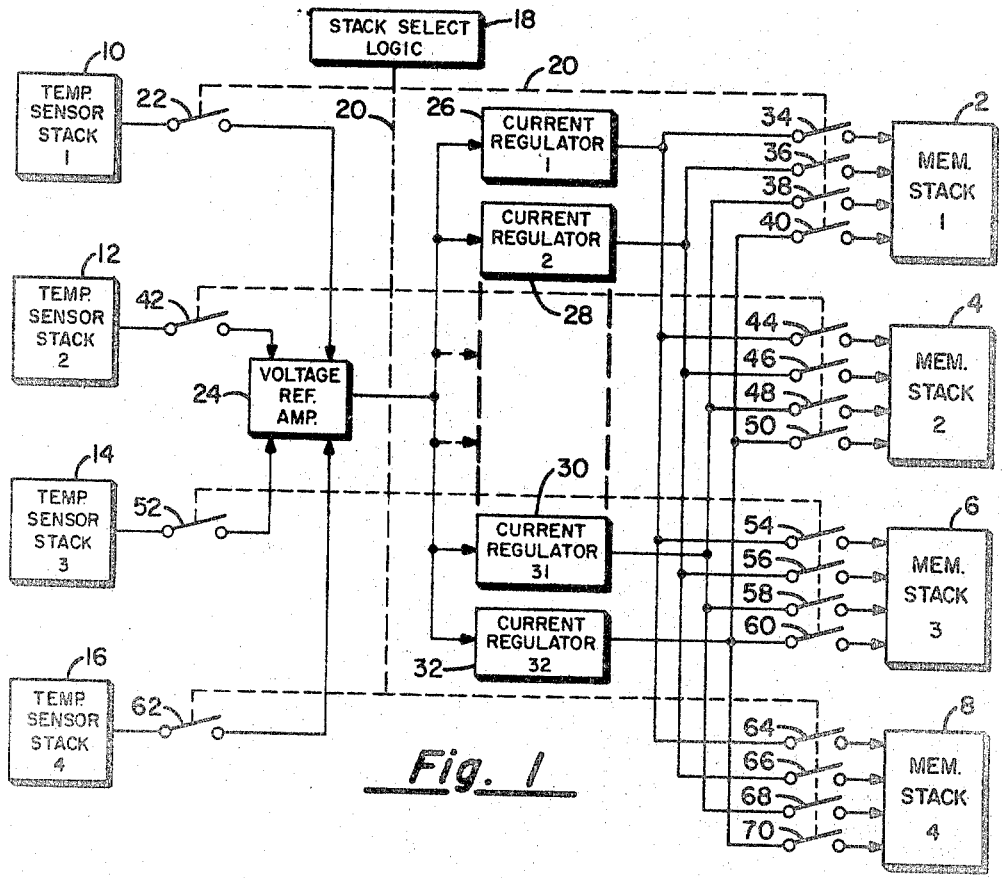
FIGURE 1 is a generalized block diagram of the entire system showing how the inventive temperature sensors are connected to the various current regulators which control the drive current to the cores in the memory stacks.

FIGURE 1 discloses a generalized block diagram of the entire system showing how the inventive temperature sensors are connected to the various current regulators which control the drive current to the memory stacks. For purposes of example only, it is assumed that four memory stacks, 2, 4, 6 and 8, are being used. A corresponding temperature sensor is located in each of the four stacks. Thus, sensors 10, 12, 14 and 16 are located respectively in memory stacks 2, 4, 6 and 8. The memory stack select logic 18 is utilized to couple the reference current output from the proper sensor to the current regulators and from the current regulators to the proper memory stack. The control of these switches is shown symbolically in FIGURE 1 by dashed lines 20. Thus, if memory stack 2 is selected, switch 22 is closed by the stack select logic 18 to connect temperature sensor 10 to voltage reference amplifier 24. The output of amplifier 24 is connected in parallel to all the current regulators. Because the stack select logic 18 has selected memory stack 2, it will close switches 34, 36, 38 and 40 to connect the outputs of the current regulators to memory stack 2. For purposes of simplicity of the drawings, only four of the 32 regulators used in the example are shown, and, thus, only four switches are shown connecting the current regulators to the memory stacks. In like manner, if stack select logic 18 selects memory stack 4, it closes switch 42 to connect temperature sensor 12 to the voltage reference amplifier 24 and also closes switches 44, 46, 48 and 50 to connect the outputs from the current regulators to memory stack 4. Similarly, if memory stack 6 is selected, the stack select logic 18 closes switch 52 to connect temperature sensor 14 to the voltage reference amplifier 24 and also closes switches 54, 56, 58 and 60 to connect the outputs of the current regulators to memory stack 6. Finally, if memory stack 8 is selected, stack select logic 18 closes switch 62, which couples the output of the temperature sensor 60 to the voltage reference amplifier 24 and simultaneously closes switches 64, 66, 68 and 70, thus connecting the outputs of the current regulators to memory stack 8.

Figure 2:
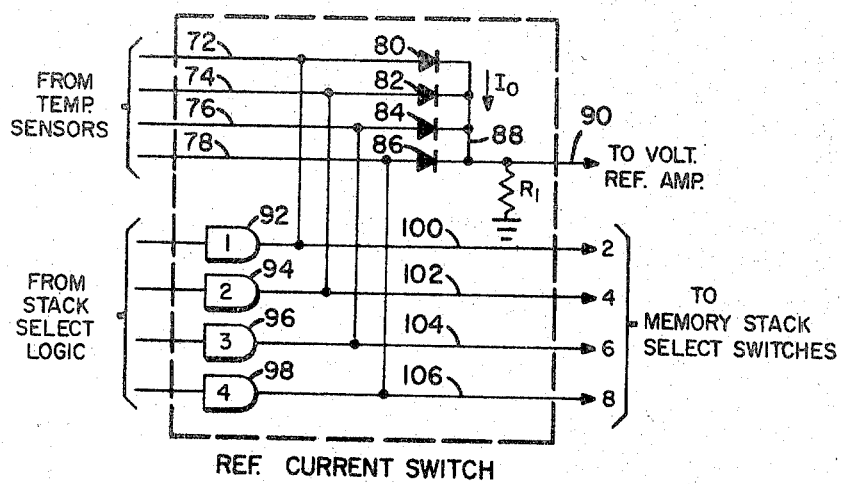
FIGURE 2 is a circuit diagram of the reference current switch showing how the outputs of the various temperature sensors are connected to the current regulators.

Switches 22, 42, 52 and 62 shown in FIGURE 1, which connect the respective reference current outputs of temperature sensors 10, 12, 14 and 16 to voltage reference amplifier 24, are known as reference current switches and are shown in detail in FIGURE 2. Considering this detail in FIGURE 2, it will be seen that the outputs from temperature sensors 10, 12, 14 and 16 in FIGURE 1 are connected respectively to lines 72, 74, 76 and 78. Each of these lines is connected to a respective one of diodes 80, 82, 84 and 86. The outputs from the diodes are connected together and develop an output voltage across resistor $R_1$ with reference current $I_0$ flowing in line 88. Thus the reference current present on line 90 develops a reference voltage across resistor $R_1$ that is coupled to the voltage reference amplifier.

Inverters 92, 94, 96 and 98 receive inputs from the stack select logic and produce outputs for effectively biasing diodes 80, 82, 84 and 86 to determine which diode will pass a reference current from its associated temperature sensor. Thus, the output from each of the inverters will normally be low to reverse bias the diodes to which they are connected. When a particular memory stack is being accessed, the stack logic will cause the appropriate inverter to produce a high output which will forward bias the diode to which it is connected to conduct, and thus transmit the reference current from the selected temperature sensor through the associated diode to line 88 to develop a voltage across $R_1$ which is the input to the voltage reference amplifier. It will also be noted that the outputs from the inverters 92, 94, 96 and 98 are not only connected to respective diodes 80, 82, 84 and 86 but also provide outputs on lines 100, 102, 104 and 106 to be coupled to the memory stack select switches. Thus, if memory stack 2 is selected, inverter 92 will produce a high output which will enable diode 80 to conduct the current on line 72 from temperature sensor 10 to the voltage reference amplifier. The output of inverter 92 will also be present on line 100, which will serve to close the switches connecting the current regulators with memory stack 2. The outputs from the other inverters 94, 96 and 98 are utilized in a similar manner.

FIGURE 3 is a circuit diagram of the inventive temperature sensor. Transistors $Q_1$ and $Q_2$ are matched silicon PNP transistors. Resistor $R_2$ is initially adjusted until $I_0$ equals the correct value for the ambient equipment temperature. $I_z$ and $I_e$ are approximately equal, thus causing the emitter-to-base voltage drops in $Q_1$ and $Q_2$ to be approximately equal. Zener diode $CR_1$, a constant voltage source, is a temperature compensated 6.2 volt Zener diode and $I_z$, which is determined by resistor $R_3$, is large enough to be well over the knee of the Zener diodes V–I characteristics. Therefore, the voltage drop across $CR_1$ is substantially constant and $CR_1$ is a constant voltage source. Resistor $R_t$ is a temperature sensitive device with a large positive temperature coefficient. The combination of resistors $R_t+R_2+R_4$ is selected so as to give the desired resistance as a function of the temperature range. The adjustment of resistor $R_2$ compensates for component tolerances at 25° C.

As the temperature rises, the resistance of $R_t$ increases and since the voltage across $R_t+R_2+R_4$ is held to a constant value by the Zener diode, the current $I_e$, which is approximately equal to the output current $I_o$, must decrease. In a similar manner, as the temperature decreases, the resistance of $R_t$ decreases, and because the voltage across $R_t+R_2+R_4$ is held to a constant value by the Zener diode, the current $I_e$, and therefore output current $I_o$ increases.

The temperature sensor in the memory stack cannot have a voltage as its output because of the voltage drop across the diodes 80, 82, 84 and 86, shown in FIGURE 2 which are used in connecting the proper sensor to the reference amplifier. This voltage drop will vary from diode to diode and will change quite rapidly as the temperature changes. However, if the output of the sensor is a temperature dependent current, the effects of the diode voltage drops are insignificant.

Thus, the temperature sensor comprises a first current path for producing an output current, said path including a temperature sensitive device having a resistance that varies with the temperature, a second current path connected in parallel with said first current path, said second path including a constant voltage source for causing the voltage across said first path to be constant whereby said first path produces an output current whose value is proportional to the change of the temperature sensed by said temperature sensitive device, a first transistor having an emitter connected in series with said first current path, a collector for providing said output current and a base, a second transistor having an emitter connected in series with said constant voltage source in said second current path, a base and a collector both connected to the base of said first transistor, said second transistor having the same emitter-to-base voltage drop as said first transistor, and a resistor connected between a ground potential and said collector of said second transistor. The circuit further includes an adjustable resistor in said first current path in series with said sensor for initially establishing the current in said first current path at a predetermined temperature.

FIGURE 4 is a circuit diagram of a conventional reference voltage amplifier. Load resistor $R_1$, shown in FIGURE 2, is a precision resistor ($\pm\frac{1}{10}\%$) and is coupled to the base of transistor $Q_3$ by conductor 108. Because the gain of transistor $Q_3$, is very high, (1)  $$V_{in} \approx I_o R_1$$

Because resistor $R_2$ in the temperature sensor shown in FIGURE 3 is adjusted at $+25°$ C. for a fixed output, the temperature sensor (and therefore memory stacks) are interchangeable within a computer and between different computers because the values of $R_1$ are almost identical.

Transistors $Q_3$ and $Q_4$ are matched so the base-to-emitter voltage drops are almost equal and the output voltage $V_o$ on line 110 is approximately equal to the input voltage $V_{in}$, on line 108. Now the gain of transistor $Q_4$ is very high so that the reference voltage on line 112 can be expressed as (2)  $$V_{ref} \approx \left(\frac{R_6 + R_7}{R_7}\right)(V_o)$$

or (3)  $$V_{ref} \approx \left(\frac{R_6 + R_7}{R_7}\right)(I_o R_1)$$

Thus, the output of the reference voltage amplifier is proportional to the product of the output current $I_o$ from the temperature sensor and $R_1$, the load resistor for the temperature sensor.

The output from the voltage reference amplifier shown in FIGURE 4 is connected to the current regulators, a particular one of which is shown in FIGURE 5. These current regulators control the amplitude of the core drive current through a group of core stack select switches.

Transistors $Q_7$ and $Q_8$ in the current regulators are a matched pair of transistors similar to transistors $Q_3$ and $Q_4$ shown in the voltage reference amplifier in FIGURE 4, and therefore voltage $V_d$ on line 114 is proportional to the voltage reference $V_{ref}$ on line 116 from the reference voltage amplifier shown in FIGURE 4. Now the current through resistor $R_{12}$ is approximately equal to the drive (or inhibit) current $I_d$ and (4)  $$I_d \simeq \frac{V_d}{R_{12}}$$

or (5)  $$I_d \simeq \frac{V_{ref}}{R_{12}}$$

Thus (6)  $$I_d \simeq (R_6 + R_7)\left(\frac{R_1 I_0}{R_7 R_{12}}\right)$$
$$\simeq K I_0$$

where K is a constant.

Thus it will be seen that the drive or inhibit current $I_d$ is directly proportional to the current $I_o$ produced by the temperature sensor.

Thus the temperature sensor monitors the temperature in the memory stack and produces a reference current that is used to develop a reference voltage indicative of the temperature. This reference voltage is coupled to the voltage reference amplifier shown in FIGURE 4 which produces an output reference voltage that is coupled to the base of transistor $Q_7$ which serves as half of a differential amplifier. Initially, transistor $Q_9$ is conducting thus placing the base of transistor $Q_{10}$ at ground potential and preventing transistors $Q_{10}$ and $Q_{11}$ from conducting. At the read or write time, AND gate 118 is enabled which produces an output that turns transistor $Q_9$ off. With transistor $Q_9$ turned off, the Darlington pair of transistors $Q_{10}$ and $Q_{11}$ will be driven on and a current path will be established from ground potential through resistor $R_{12}$, transistor $Q_{11}$, one of switches 120, 122, 124, or 126, the ferrite cores in the memory stack and to the positive side of a voltage source. The voltage developed across resistor $R_{12}$ is sensed at the base of transistor $Q_8$. If this voltage is less than the reference voltage on line 116 coupled to the base of transistor $Q_7$, the current from voltage source 128 through resistor $R_8$ will cause the Darlington pair to conduct harder, thus developing more voltage across resistor $R_{12}$. The voltage across resistor $R_{12}$ will increase to a point where it equals the reference voltage on line 116 to the base of transistor $Q_7$. At that instant, transistor $Q_8$ will turn on and shunt the excess base drive current to ground. The current in the selected drive line will then be at a proper value with respect to the stack temperature.

In summary, any time the voltage developed across resistor $R_{12}$ is equal to or greater than the reference voltage on line 116, transistor $Q_8$ will turn on. The result is that a proper value of base drive current is metered out to drive the Darlington pair so that the current through the drive line is always of an appropriate value with respect to the temperature in the memory stack.

The output of transistor $Q_{11}$ of the Darlington pair on line 130 is coupled to the emitter of a transistor in each of the switch circuits 120, 122, 124 and 126. Coupled between the base and the emitter of the transistor in each of the switch circuits is the secondary winding of a transformer. The primary windings 132, 134, 136 and 138 of each of the transformers are connected to the outputs of the respective inverters 92, 94, 96 and 98 on lines 100, 102, 104 and 106 as shown in FIGURE 2. Thus, if inverter 92 produces an output on line 100, the signal is coupled to input transformer winding 132 and is coupled to the secondary winding 140, which causes transistor switch 120 to conduct, thus connecting the output of transistor $Q_{10}$ on line 130 to core memory stack 2. In like manner, if inverter 94 produces an output on line 102 that is coupled to transformer primary winding 134, switch 122 conducts and connects the output of transistor $Q_{10}$ on line 130 to memory stack 4. Also, if inverters 96 or 98 produce outputs respectively on lines 104 and 106, the signal is coupled respectively to transformer input windings 136 or 138 which causes switch 124 or 126 respectively to conduct thus connecting the output of transistor $Q_{10}$ on line 130 memory stack 6 or 8, respectively.

Thus applicant has disclosed a novel temperature sensing circuit which produces an output current whose variations depend substantially entirely upon variations of the resistance of a resistor with changes in temperature, said resistor having a known temperature coefficient.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. A temperature sensing circuit comprising:
    (a) a first current path for producing an output current, said path including a temperature sensitive device having a positive coefficient of resistance and a first transistor having an emitter electrode connected in series circuit with said temperature sensitive device, a collector electrode for providing said output current and a base;
    (b) a second current path connected in parallel with said first current path, said second path including a constant voltage source for causing the voltage across said first path to be constant, a second transistor having an emitter connected in series with said constant voltage source in said second voltage path, a base and a collector electrode both connected to said base of said first transistor, said second transistor having the same emitter-to-base voltage drop as said first transistor thereby cancelling the effect of said drop across said first transistor; and
    (c) a resistor connected between a point of fixed potential and said collector of said second transistor, the arrangement being such that said first path produces an output current whose value is proportional to the change in the temperature sensed by said temperature sensing device.

2. A circuit as in claim 1 further including:
(a) an adjustable resistor in said first current path in series with said sensor for initially establishing the current in said first path at a predetermined temperature.

3. A circuit as in claim 1 wherein said temperature sensitive device is:
(a) a resistor having a positive temperature coefficient.

4. A circuit as in claim 1 wherein said constant voltage source is:
(a) a Zener diode.

References Cited

UNITED STATES PATENTS

| | | | |
|---|---|---|---|
| 2,871,376 | 1/1959 | Kretzmer | 307—310 |
| 3,092,730 | 6/1963 | Rowell | 307—310 |
| 3,271,660 | 9/1966 | Hilbiber | 307—310 |
| 3,324,352 | 6/1967 | Hover | 307—310 |

JOHN S. HEYMAN, Primary Examiner

H. A. DIXON, Assistant Examiner